(12) United States Patent
Tomiyama

(10) Patent No.: US 11,907,778 B2
(45) Date of Patent: Feb. 20, 2024

(54) TAG COMMUNICATION DEVICE AND INFORMATION PROCESSING METHOD

(71) Applicant: TOSHIBA TEC KABUSHIKI KAISHA, Tokyo (JP)

(72) Inventor: Takashi Tomiyama, Sunto Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/889,005

(22) Filed: Aug. 16, 2022

(65) Prior Publication Data

US 2023/0060257 A1 Mar. 2, 2023

(30) Foreign Application Priority Data

Sep. 1, 2021 (JP) .................. 2021-142620

(51) Int. Cl.
*G06K 17/00* (2006.01)
*G06K 7/10* (2006.01)

(52) U.S. Cl.
CPC ..... *G06K 17/0025* (2013.01); *G06K 7/10316* (2013.01); *G06K 17/00* (2013.01)

(58) Field of Classification Search
CPC ...... G06K 17/00; G06K 17/0025; G06K 7/00; G06K 7/0008; G06K 7/10; G06K 7/10019; G06K 7/10316; G06K 7/10356; G06F 11/00; G06F 11/10; G06F 11/1683; G06F 11/1687; G06F 11/1695; G08B 29/00
See application file for complete search history.

(56) References Cited

U.S. PATENT DOCUMENTS

| 6,946,950 B1* | 9/2005 | Ueno | G06K 7/0008 340/10.2 |
| 2006/0056325 A1* | 3/2006 | Wood | H04W 76/11 370/312 |

(Continued)

FOREIGN PATENT DOCUMENTS

JP 2015-079351 A 4/2015

OTHER PUBLICATIONS

NPL Search (Jun. 7, 2023).*

*Primary Examiner* — Van T Trieu
(74) *Attorney, Agent, or Firm* — FOLEY & LARDNER LLP

(57) ABSTRACT

A tag communication device includes a communication device and one or more control processors configured to cause the communication device to transmit a first command for notifying selection of a wireless tag including an identification code including a mask pattern that is a part of the common portion of identification codes. The one or more control processors are configured to cause the communication device to transmit a second command for requesting a response to the selected wireless tag and to cause the communication device to transmit a third command for requesting rewriting to the wireless tag that transmits data in response to receiving the data transmitted from one wireless tag. The one or more control processors are configured to cause a repeat of transmission of the second command if a third command is transmitted until the third commands are transmitted to each of a predetermined number of the wireless tags.

8 Claims, 10 Drawing Sheets

(56) References Cited

U.S. PATENT DOCUMENTS

| | | | |
|---|---|---|---|
| 2006/0077039 A1* | 4/2006 | Ibi | G06K 7/10435 |
| | | | 340/10.51 |
| 2007/0210162 A1* | 9/2007 | Keen | G06K 19/0723 |
| | | | 235/375 |
| 2009/0217144 A1* | 8/2009 | Turner | G06K 7/0008 |
| | | | 340/572.1 |

\* cited by examiner

TAG COMMUNICATION DEVICE AND INFORMATION PROCESSING METHOD

CROSS-REFERENCE TO RELATED APPLICATION

This application is based upon and claims the benefit of priority from Japanese Patent Application No. 2021-142620, filed on Sep. 1, 2021, the entire contents of which are incorporated herein by reference.

FIELD

Embodiments described herein relate generally to a tag communication device and an information processing method.

BACKGROUND

In a typical image forming device, an image is formed on a print medium including a plurality of labels to which wireless tags are attached respectively, and an identification code of each wireless tag is individually rewritten.

DETAILED DESCRIPTION

Typically, in a tag communication device applied to an image forming device, a plurality of wireless tags are close to each other, and thus it is required to take mechanical measures such as arrangement of a radio wave shielding member or the like, so that the plurality of wireless tags can be sequentially communicated one by one.

One of the objectives of the embodiments described herein is to provide a tag communication device and an information processing method that can implement rewriting of identification codes of a plurality of wireless tags with a simple configuration.

In general, according to one embodiment, the tag communication device may include one processor or multiple processors. For example, a tag communication device may include a communication unit or communication device, a selection unit or selection processor, a request unit or requesting processor, a rewrite unit or rewriting processor, and a control unit or controller. The communication unit or communication device wirelessly communicates with a plurality of wireless tags each storing an identification code including an existing common portion as at least a part of the common portion of the identification code. The selection unit designates at least a part of the common portion as a mask pattern and causes the communication unit to transmit a first command for notifying selection of the wireless tag including the identification code including the corresponding mask pattern. The request unit causes the communication unit to transmit a second command for requesting a response to the selected wireless tag. The rewrite unit causes the communication unit to transmit a third command for requesting rewriting of the identification code to one of the wireless tags that transmits data in response to reception of the data transmitted from the one wireless tag with respect to the second command by the communication unit. The control unit causes the request unit to repeat transmission of the second command if a third command is transmitted by the rewrite unit until the third commands are transmitted by the rewrite unit to each of a predetermined number of the wireless tags, or if the data transmitted from one wireless tag is not received by the communication unit with respect to the transmission of the second command by the request unit.

Hereinafter, an example of an embodiment is described with reference to the drawings. In addition, the present embodiment is described using a multifunction device having a function as a tag communication device as an example.

Figure 1:
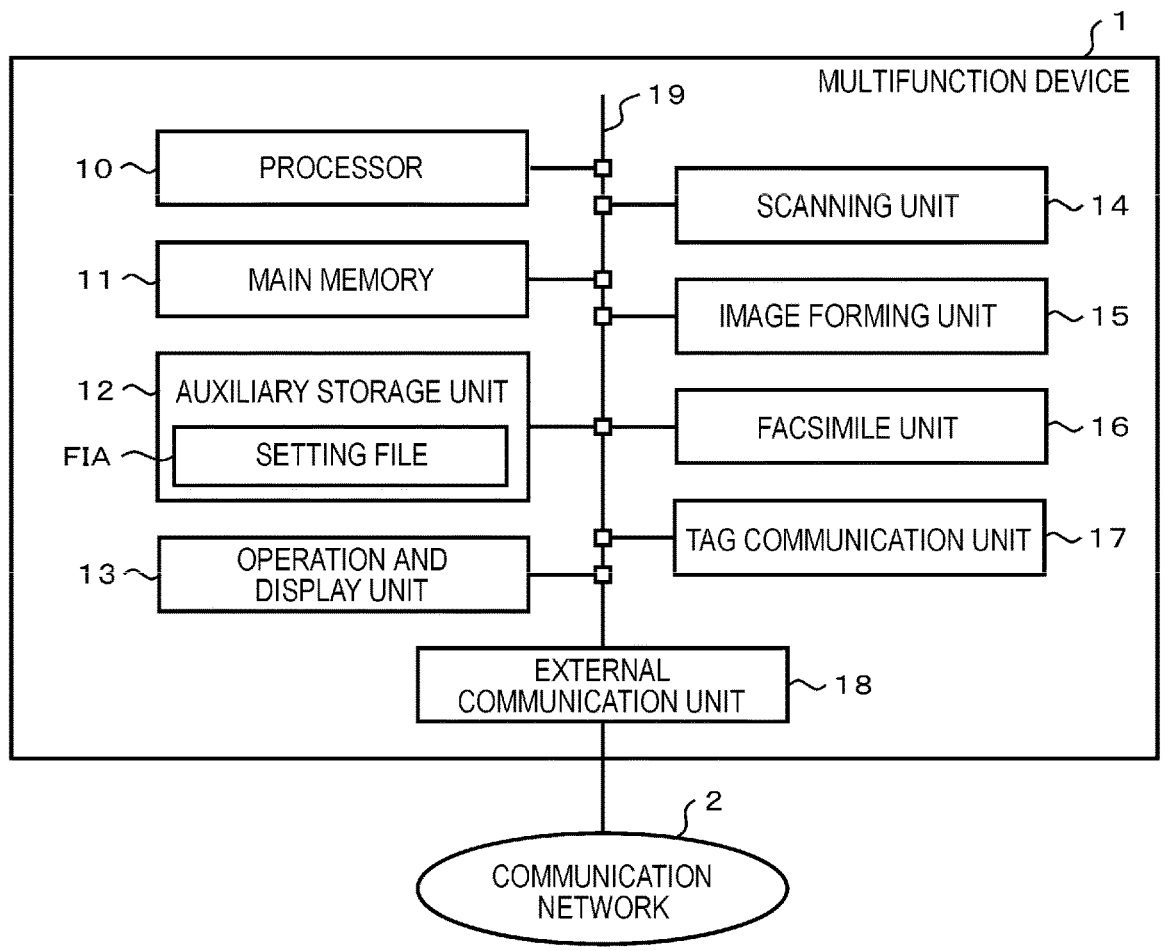
FIG. 1 is a block diagram illustrating a main circuit configuration of a multifunction device according to an embodiment.

FIG. 1 is a block diagram illustrating a main circuit configuration of a multifunction device 1 according to the present embodiment.

The multifunction device 1 is a device having multiple functions as a copier, a scanner, a printer, a facsimile machine, and the like. However, the multifunction device 1 is not required to have all of these functions or may have other functions, for example, a file server function. In addition, the multifunction device 1 is also referred to as a multi-function peripheral (MFP).

The multifunction device 1 includes a processor 10, a main memory 11, an auxiliary storage unit or auxiliary storage 12, an operation and display unit or display 13, a scanning unit or scanner 14, an image forming unit 15, a facsimile unit or a facsimile machine 16, a tag communication unit 17, an external communication unit 18, a transmission line 19, and the like. The processor 10, the main memory 11, the auxiliary storage unit 12, the operation and display unit 13, the scanning unit 14, the image forming unit 15, the facsimile unit 16, the tag communication unit 17, and the external communication unit 18 are connected to each other via the transmission line 19.

The processor 10, the main memory 11, and the auxiliary storage unit 12 are connected to each other via the transmission line 19 and configure a computer that performs an information process.

The processor 10 corresponds to a central portion of the computer. The processor 10 performs an information process according to an information processing program such as an operating system, middleware, and an application program.

The main memory 11 corresponds to a main storage portion of the computer. The main memory 11 includes a nonvolatile memory area and a volatile memory area. The main memory 11 stores the information processing program in the nonvolatile memory area. In addition, the main memory 11 may store data required for performing a process for controlling each unit by the processor 10 in the nonvolatile or volatile memory area. The main memory 11 uses the volatile memory area as a work area in which data is appropriately rewritten by the processor 10.

The auxiliary storage unit 12 corresponds to an auxiliary storage portion of the computer. As the auxiliary storage unit 12, for example, a well-known storage device such as an electric erasable programmable read-only memory (EE-PROM), a hard disc drive (HDD), and a solid state drive (SSD) can be used singly or a plurality thereof can be used in combination. The auxiliary storage unit 12 stores data to be used for various processes by the processor 10 and data generated by the process of the processor 10. The auxiliary storage unit 12 stores an information processing program. A part of a storage area of the auxiliary storage unit 12 is used for storing a setting file FIA described below.

The operation and display unit 13 inputs an operation by the user who uses the multifunction device 1 and performs display for presenting various kinds of information to the user. The operation and display unit 13 may appropriately include various operation devices and display devices such as a touch panel, a keyboard, a key switch, an LED lamp, or a liquid crystal display panel.

The scanning unit 14 reads a document and generates image data of an image represented on the document.

The image forming unit 15 forms an image represented by the image data on a print medium. The image forming unit 15 includes a well-known image forming device, for example, an electrophotographic image forming unit. As the print medium, various well-known media such as cut paper may be used, and one of the media includes a label paper with tags.

Figure 2:
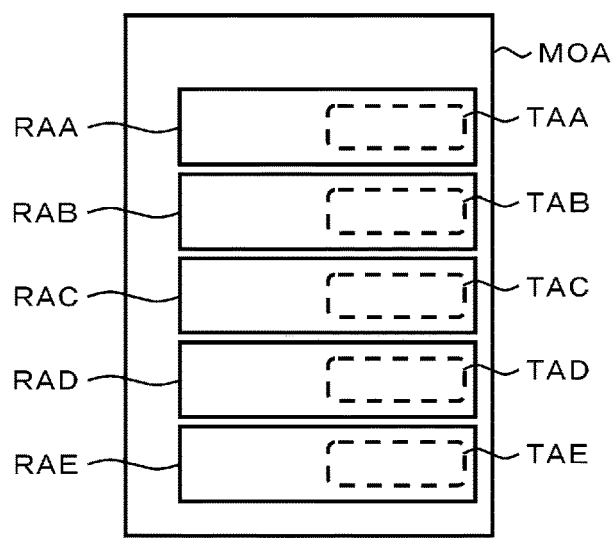
FIG. 2 is a diagram illustrating an example of label paper with tags.

FIG. 2 is a diagram illustrating an example of label paper with tags.

The label paper with tags illustrated in FIG. 2 is configured so that, for example, labels RAA, RAB, RAC, RAD, and RAE to which wireless tags TAA, TAB, TAC, TAD, and TAE are respectively attached are attached to an A4-size mount MOA. In addition, the wireless tag is also referred to as a radio frequency identification (RFID) tag. In addition, hereinafter, if it is not necessary to distinguish them individually, the wireless tags TAA, TAB, TAC, TAD, and TAE are referred to as the wireless tags TA.

In addition, the label paper with tags illustrated in FIG. 2 is merely an example, and the size of the mount, the size of a label, the number of labels, the dimension of a label, the shape of a label, positions of the labels on the mount, an attached position of a wireless tag in a label, and the like may be freely selected. In addition, a plurality of kinds of label paper with tags in which a part among the size of the mount, the size of a label, the number of labels, the dimension of a label, the shape of a label, positions of the labels on the mount, an attached position of a wireless tag in a label, and the like is different may be selectively used.

However, hereinafter, a case where the label paper with tags illustrated in FIG. 2 is used as a print medium is described.

The facsimile unit 16 in FIG. 1 performs various well-known processes for performing image communication in conformity with the facsimile standard via a communication network (not illustrated) such as a public switched telephone network (PSTN).

If the label paper with tags is used as the print medium, the tag communication unit 17 performs wireless communication with the plurality of wireless tags TA attached to the corresponding print medium. In addition, the timing when the tag communication unit 17 communicates with the wireless tag TA may be any one of a timing before the print medium is sent to the image forming unit 15, a timing in the middle of forming an image to the print medium by the image forming unit 15, or a timing after the print medium is discharged from the image forming unit 15.

The external communication unit 18 performs a communication process for performing data communication with a device outside the multifunction device 1 via a communication network 2. The external communication unit 18 can use, for example, an existing communication device for a local area network (LAN).

The transmission line 19 includes an address bus, a data bus, a control signal line, and the like, and transmits data and a control signal that are transmitted and received between connected units.

Figure 3:
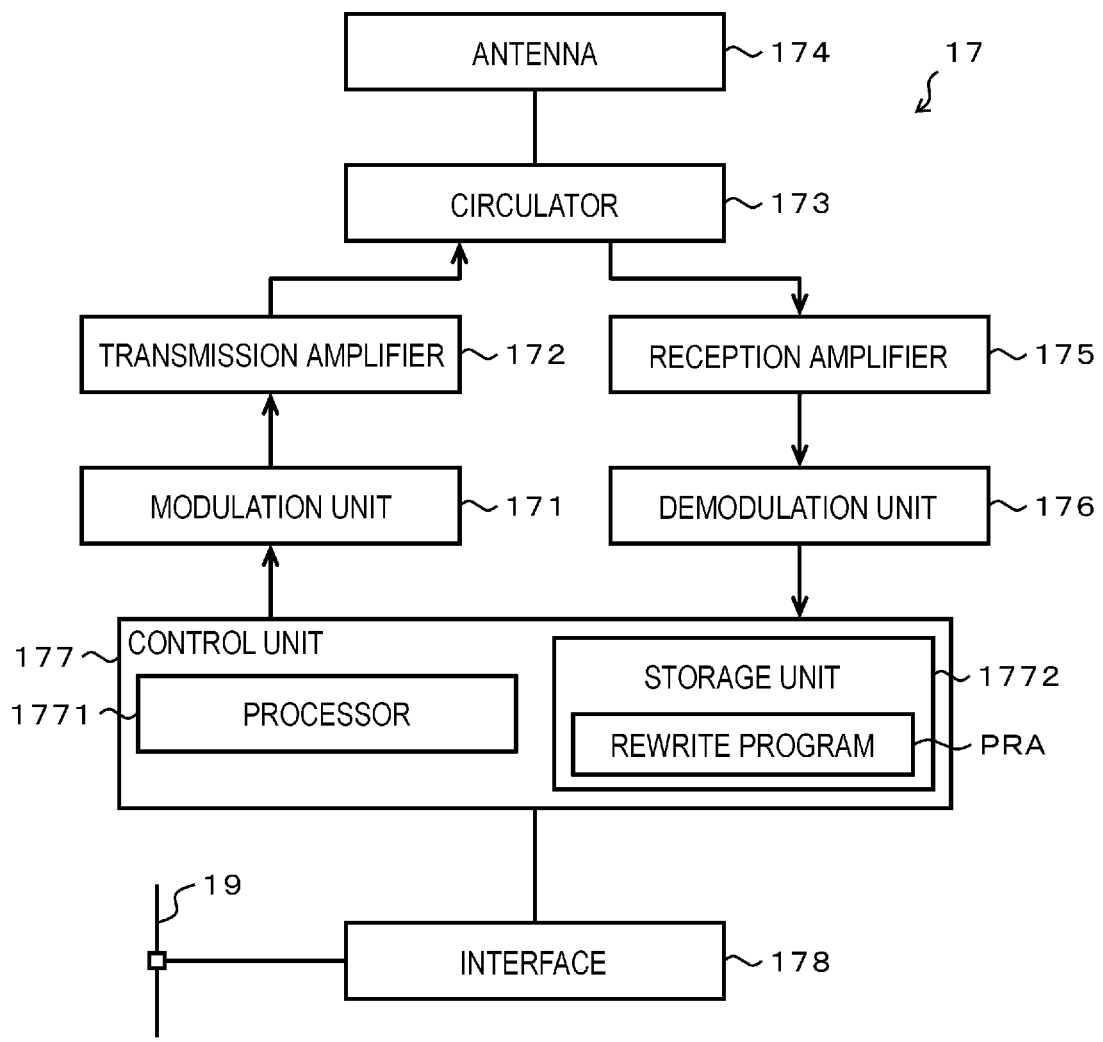
FIG. 3 is a block diagram illustrating a main circuit configuration of a tag communication unit in FIG. 1.

FIG. 3 is a block diagram illustrating a main circuit configuration of the tag communication unit 17.

The tag communication unit 17 includes a modulation unit or modulator 171, a transmission amplifier 172, a circulator 173, an antenna 174, a reception amplifier 175, a demodulation unit or demodulator 176, a control unit or controller 177, and an interface 178.

The modulation unit 171 modulates a carrier wave by the data given from the control unit 177 to obtain a transmission signal. In addition, while data is not given from the control unit 177, the modulation unit 171 can output an unmodulated carrier wave as a transmission signal, as it is.

The transmission amplifier 172 amplifies the transmission signal output from the modulation unit 171 and sets the transmission signal to be in a signal state appropriate for wireless transmission.

The circulator 173 outputs the transmission signal output from the transmission amplifier 172 to the antenna 174. The circulator 173 outputs a reception signal obtained by the antenna 174 as described below to the reception amplifier 175. Accordingly, the circulator 173 can use the antenna 174 for both of the transmission and reception.

The antenna 174 radiates radio waves in response to the transmission signal given from the circulator 173. The antenna 174 outputs electric signals in response to radio waves received through a space to the circulator 173 as reception signals.

The reception amplifier 175 amplifies weak reception signals obtained by the antenna 174 from weak radio waves that are radiated from the wireless tag TA and received by the antenna 174 and causes the signals to be in a signal state appropriate for the process in the demodulation unit 176.

The demodulation unit 176 demodulates data if the reception signal is a modulated signal by data.

A function as a communication unit or communication device is implemented by the modulation unit 171, the transmission amplifier 172, the circulator 173, the reception amplifier 175, and the demodulation unit 176 or by adding the antenna 174 thereto.

For the communication with the wireless tag TA according to the communication standard determined in advance, the control unit 177 outputs the data to the modulation unit

171 or processes the data obtained by the demodulation unit 176. The control unit 177 receives all data such as setting data for communication with the wireless tag TA by the communication with the processor 10 by the interface 178 via the transmission line 19. The control unit 177 notifies the processor 10 of all data such as data read from the wireless tag TA by the communication with the processor 10 by the interface 178 via the transmission line 19.

The control unit 177 includes a processor 1771 and a storage unit or storage 1772. The processor 1771 includes a central processing unit (CPU). The processor 1771 may include a fast signal processing processor using an application-specific integrated circuit (ASIC) or the like. The processor 1771 controls an operation of each unit of the tag communication unit 17 to perform transmission and reception in a sequence in conformity with the communication standard and performs an information process and a signal process for generation and output of data to be transmitted and a process of received data. The storage unit 1772 stores an information processing program for the processor 1771. In addition, the storage unit 1772 is used as a work area that stores data required for performing the information process or the signal process by the processor 1771. One of the information processing programs stored in the storage unit 1772 is a rewrite program PRA described in relation to a rewrite process described below. The rewrite program PRA may be stored in the storage unit 1772 if the multifunction device 1 is transferred or may be written to the storage unit 1772 in response to an operation of a user or a maintenance worker of the multifunction device 1 after the multifunction device 1 is transferred. In the latter case, for example, it is assumed that the rewrite program PRA is provided as a version upgrade program. It is assumed that the rewrite program PRA is transferred by the communication via the network. However, the rewrite program PRA may be transferred by being recorded in a removable recording medium such as a magnetic disk, a magneto-optical disk, an optical disk, or a semiconductor memory.

The interface 178 performs an interface process for data communication via the transmission line 19.

Hereinafter, the operation of the multifunction device 1 configured as above is described. In addition, the contents of the process described below are examples, and a change of an order of some processes, omission of some processes, addition of another process, or the like is possible as appropriate. According to the present embodiment, the wireless communication between the tag communication unit 17 and the wireless tag TA conforms with international standards organization (ISO)/international electrotechnical commission (IEC) 18000-6 Type C.

The multifunction device 1 operates so as to realize various functions as a copier, a scanner, a printer, a facsimile device, and the like. The operations may be the same as the operations of another multifunction device of the same kind. The characteristic operation of the multifunction device 1 according to the present embodiment is an operation for rewriting an identification code of the wireless tag TA. Therefore, hereinafter, the operations are mainly described. In addition, the identification code of the wireless tag TA is also referred to as an electronic product code (EPC).

As a premise, the wireless tags TAA to TAE are set in advance with identification codes of which at least a part is common. According to the present embodiment, the same identification code is set for all of the wireless tags TAA to TAE. The identification code may be "3008 33B2 DDD9 0140 0000 0000". This identification code is an identification code that can be set at the time of shipment for a product called "Monza 5" manufactured by Impinj, Inc. of Seattle, U.S.A. However, different codes of which a portion on the head side is common may be set for the wireless tags TAA to TAE. The wireless tags TAA to TAE store identification codes set as above in the memories built therein, respectively.

For the number of tags, as one of the settings related to printing using the label paper with tags as illustrated in FIG. 2 as the print medium, "5" is defined. For a mask pattern as one of the corresponding settings, any part of the codes that is common among the identification codes before rewriting of the wireless tags TAA to TAE may be determined, but "3008 33B2" corresponding to the first eight digits is used here. The mask pattern may be all of the common portions of the identification code. In addition, as the identification code after the rewriting as one of the corresponding settings, any code may be determined, but "3010 2EDA F110 F040 0000 0001" to "3010 2EDA F110 F040 0000 0005" are used here. However, the identification codes after the rewriting have to be determined so that mask patterns are not identical. In addition, all or a part of the five identification codes after the rewriting may be determined to be identical. The setting data representing these settings may be generated by the processor 10 in response to the operation by an operator, for example, on the operation and display unit 13 and included in the setting file FIA. Alternatively, the setting data may be acquired from a server device or a computer device (not illustrated in FIG. 1) via the communication network 2 and included in the setting file FIA. In other words, the auxiliary storage unit 12 stores a code designated by an operator as a mask pattern in the setting file FIA and has a function as a storage unit.

If the processor 10 is required to perform printing using the label paper with tags as a print medium, together with the rewriting of the identification code, due to an operation on the operation and display unit 13 or a request via the communication network 2, the processor 10 operates the image forming unit 15 as is well known, so that an image is formed on a print medium, and instructs the tag communication unit 17 to perform rewriting. Also, thereafter, the processor 10 reads the setting data from the setting file FIA and sends the setting data to the tag communication unit 17. In addition, if the processor 10 starts the corresponding printing in response to the request performed via the communication network 2, the setting data acquired via the communication network 2 may be sent to the tag communication unit 17.

In the tag communication unit 17, if the data transmitted for instructing the rewriting from the processor 10 is received via the interface 178, the processor 1771 starts the rewrite process according to the rewrite program PRA.

Figure 4:
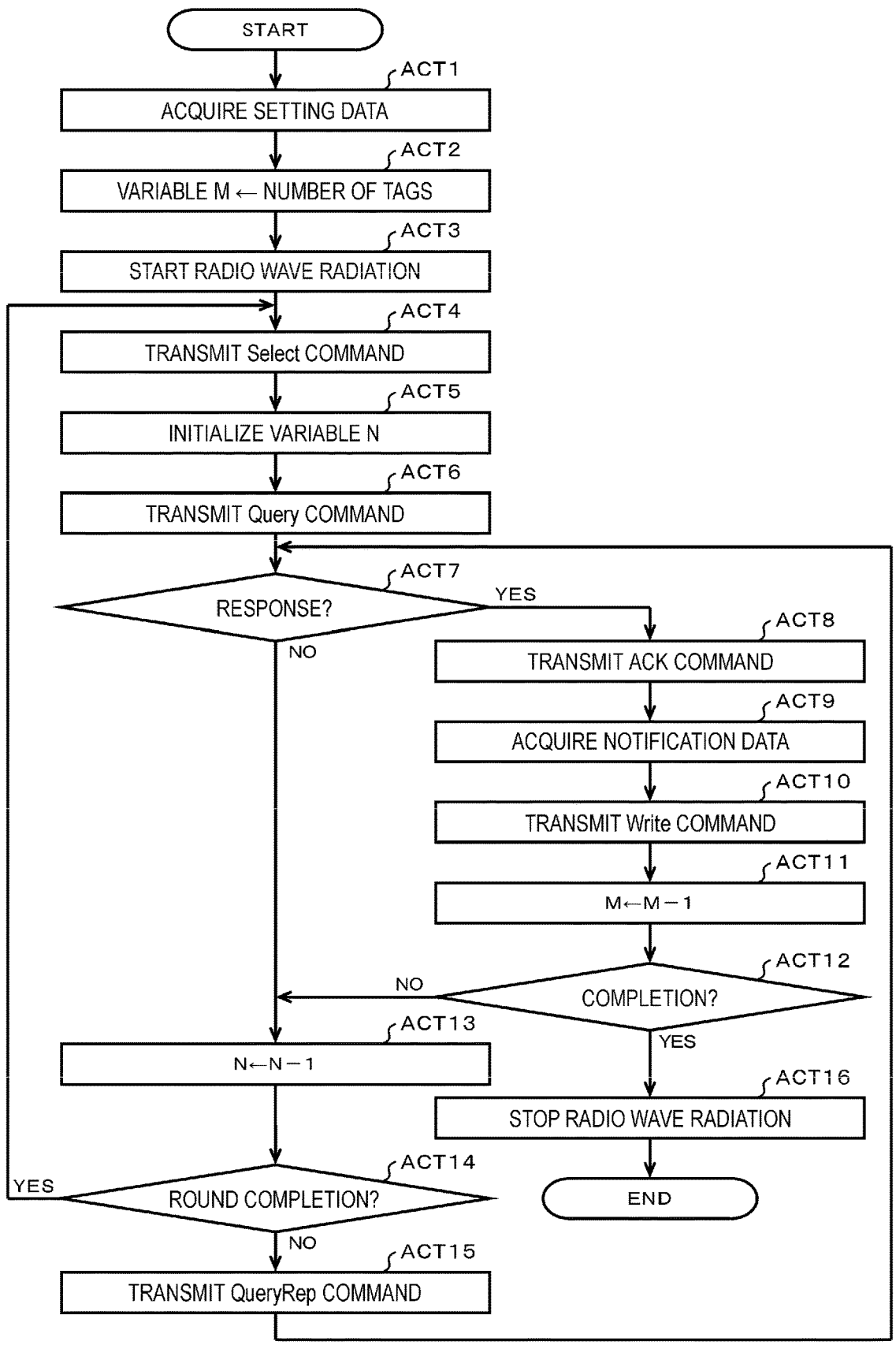
FIG. 4 is a flowchart illustrating a rewrite process by a processor in FIG. 3.

FIG. 4 is a flowchart of the rewrite process by the processor 1771.

In ACT 1, the processor 1771 acquires the setting data sent from the processor 10 as above via the interface 178. In addition, the processor 1771 stores the acquired setting data in the storage unit 1772.

In ACT 2, the processor 1771 sets the number of wireless tags represented by the setting data to a variable M. That is, according to the present embodiment, the processor 1771 sets "5" to the variable M. The variable M is a variable for managing the number of the wireless tags TA of which the identification codes are to be rewritten.

In ACT 3, the processor 1771 starts radio wave radiation. The processor 1771 outputs, for example, carrier waves that is not modulated by the data to the modulation unit 171, as the transmission signal. The transmission signal is amplified by the transmission amplifier 172 and then supplied to the antenna 174 via the circulator 173, so that radio wave radiation from the antenna 174 starts.

In this manner, if the radio waves radiated from the antenna 174 reach the wireless tag TA, the wireless tag TA starts the operation by electric power obtained from the radio waves. Also, the wireless tag TA generates, for example, a random number RN of 16 bits.

FIGS. 5, 6, 7, 8, 9, 10, and 11 are diagrams illustrating examples of sequences of communication between the tag communication unit 17 and the wireless tags TAA to TAE and state changes of the wireless tags TAA to TAE.

Figure 5:
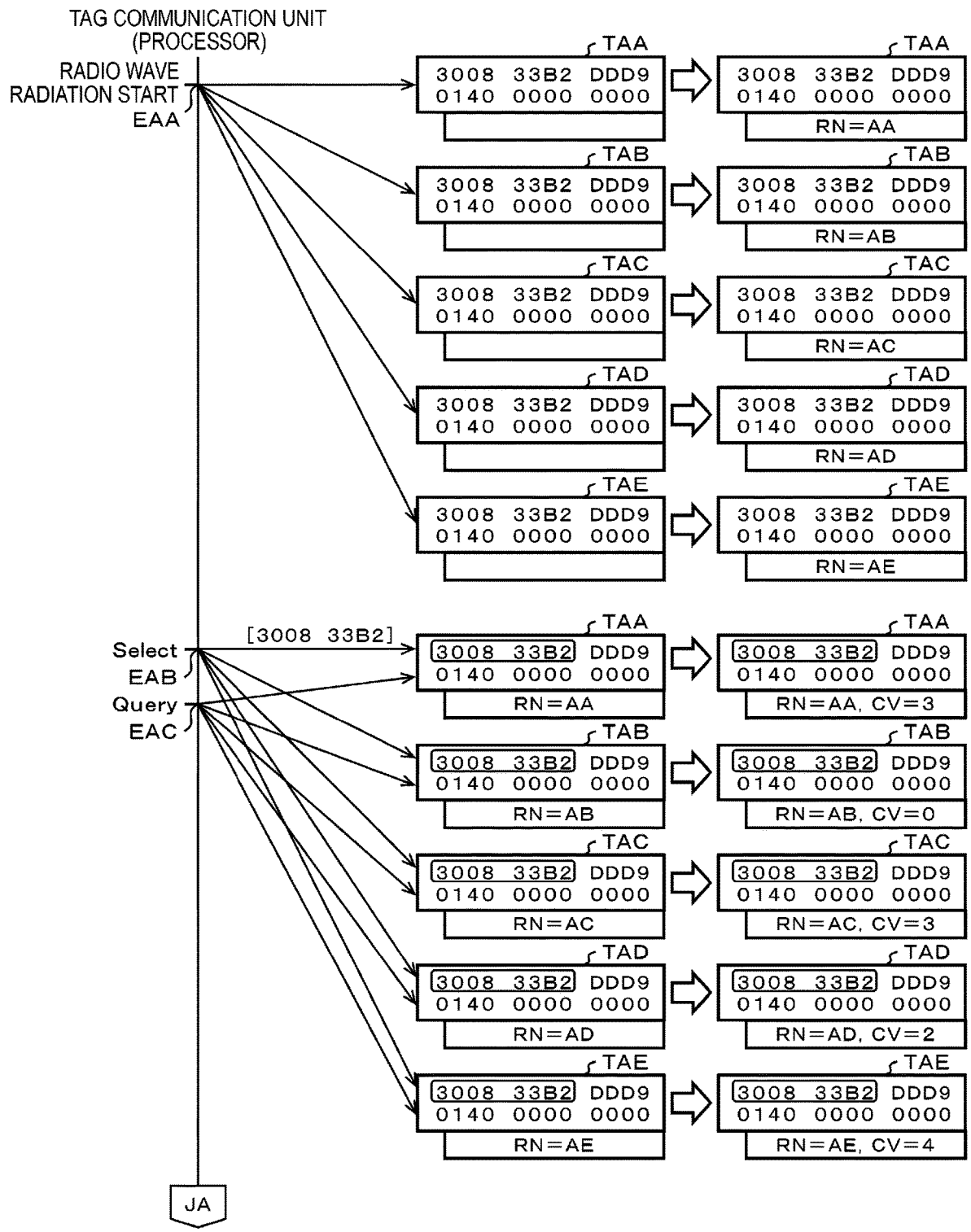
FIG. 5 is a diagram illustrating an example of a sequence of communication between a tag communication unit and a wireless tag and a state change of the wireless tag.

As an event EAA in FIG. 5, the wireless tags TAA to TAE respectively generate "AA", "AB", "AC", "AD", and "AE" as the random numbers RN in response to the start of radio wave radiation from the tag communication unit 17. In addition, "AA", "AB", "AC", "AD", and "AE" each represent any numerical value of 16 bits. A plurality of "AA", "AB", "AC", "AD", and "AE" may be the same numerical value.

In ACT 4, the processor 1771 transmits a Select command. When transmitting the Select command and various commands described below, the processor 1771 generates, for example, data corresponding to each command and outputs the data. Then, a transmission signal modulated by the Select command is obtained by the modulation unit 171, amplified by the transmission amplifier 172, and then wirelessly transmitted from the antenna 174. The processor 1771 includes a mask pattern represented by the setting data acquired in ACT 1 in the Select command. The transmission of the Select command is an event EAB in FIG. 5. The Select command is received by the wireless tags TAA to TAE. The Select command is a command that designates a mask pattern and notifies to select the wireless tag TA having the identification code including the corresponding mask pattern, and corresponds to a first command. Thus, the processor 1771 performs the information process based on the rewrite program PRA, so that the processor 1771 functions as a selection unit or selection processor. In addition, the mask pattern represented by the setting data acquired in ACT 1 is the code stored in the auxiliary storage unit 12 as the storage unit, and thus the function of the processor 1771 as the selection unit is to set the code stored in the storage unit as the mask pattern.

In ACT 5, the processor 1771 initializes a variable N. The variable N is a variable for managing the number of repetitions of tag detection. The processor 1771 sets a predetermined number, for example, as a limit number of the repetition of the tag detection to the variable N.

In ACT 6, the processor 1771 transmits a Query command. The transmission of the Query command is an event EAC in FIG. 5. The Query command is received by each of the wireless tags TAA to TAE. The Query command and a QueryRep command described below are commands for requesting a response to the wireless tag TA selected by the Select command and correspond to a second command. Thus, the processor 1771 performs the information process based on the rewrite program PRA so that the processor 1771 functions as a request unit or requesting processor.

If the Query command is received, if an identification code having an identical mask pattern included in the Select command is included, the wireless tag TA randomly determines a counter value CV as a numerical value in a predetermined area. All of the wireless tags TAA to TAE include identification codes having the identical mask patterns and thus generate "3", "0", "3", "2", and "4" as the counter value CV in response to the event EAC in FIG. 5. Each of the wireless tags TA generates the counter value CV independently from each other, and thus the plurality of counter values CV may have the same numerical value as in the above example.

If the determined counter value CV is "0", the wireless tag TA transmits response data for notifying the random number RN. In addition, for the transmission of the response data and various kinds of data described below from the wireless tag TA, for example, backscatter communication is used.

Figure 6:
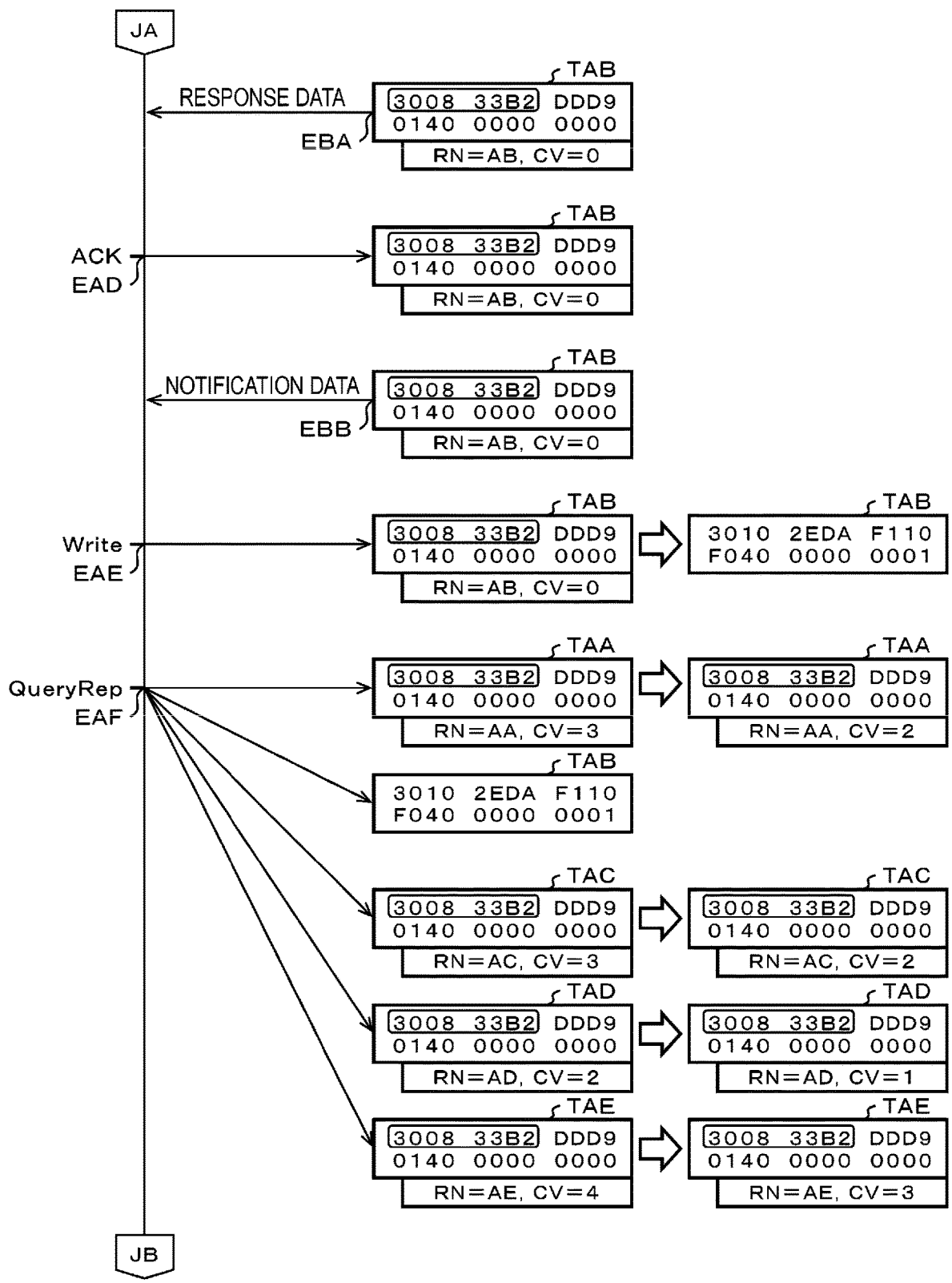
FIG. 6 is a diagram illustrating an example of a sequence of communication between the tag communication unit and the wireless tag and state changes of the wireless tag.
Figure 7:
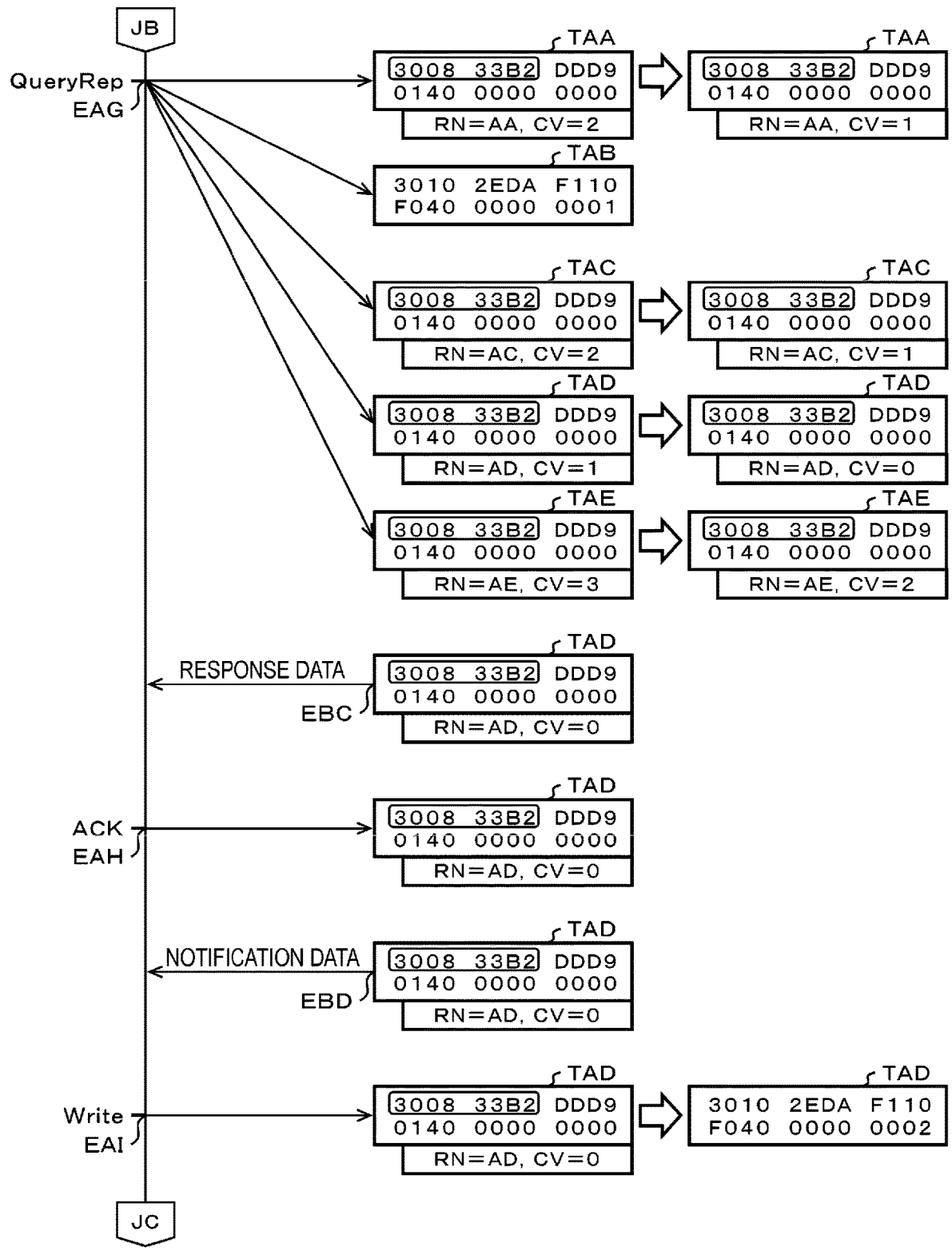
FIG. 7 is a diagram illustrating an example of a sequence of communication of the tag communication unit and the wireless tag and state changes of the wireless tag.

In the example of FIG. 5, only the wireless tag TAB determines "0" as the counter value CV, and thus the wireless tag TAB transmits response data including data representing "AB" that is the random number RN of its own as an event EBA in FIG. 6.

In ACT 7 in FIG. 4, the processor 1771 confirms whether the response from the wireless tag TA is made.

If a reflected wave from the wireless tag TA that is modulated by various kinds of data reaches the antenna 174, and a reception signal in response to the reflected wave is output from the antenna 174, data is demodulated in the demodulation unit 176 through the amplification by the reception amplifier 175. Then, the data demodulated in this manner can be given to the control unit 177. In this manner, if the response data transmitted from the wireless tag TAB as described above is given from the demodulation unit 176 to the control unit 177, if the response data is correctly received, the processor 1771 determines YES in ACT 7 and proceeds to ACT 8.

In ACT 8, the processor 1771 transmits an ACK command. The transmission of the ACK command is an event EAD in FIG. 6. The ACK command is a command notifying the wireless tag TA that transmits the response data of the reception of the response data. Also, if the ACK command is received, the wireless tag TA transmits the notification data. The wireless tag TA includes an identification code stored in the built-in memory in the notification data. That is, the notification data is data for notifying the identification code. In the example of FIG. 6, the ACK command transmitted in the event EAD is a notification to the wireless tag TAB. Also, the wireless tag TAB transmits the notification data including the identification code "3008 33B2 DDD9 0140 0000 0000" as an event EBB.

In ACT 9 in FIG. 4, the processor 1771 acquires the notification data demodulated by the demodulation unit 176.

In ACT 10, the processor 1771 transmits a Write command. The transmission of the Write command is an event EAE in FIG. 6. The processor 1771 includes one identification code represented as an identification code after rewriting to the setting data acquired in ACT 1 in the Write command. The Write command is a command for requesting the rewriting of the identification code and corresponds to a third command. Thus, the processor 1771 performs the information process based on the rewrite program PRA, so that the processor 1771 functions as a rewrite unit.

The wireless tag TA that transmits notification data that triggers the transmission of the Write command waits for the Write command and rewrites the identification code stored in the built-in memory to the identification code included in the Write command when receiving the Write command transmitted as above. In the example of FIG. 6, the wireless tag TAB receives the Write command transmitted in the event EAE and rewrites the identification code to "3010 2EDA F110 F040 0000 0001" included in the Write command.

In addition, the processor 1771 transmits the Write command through the transmission of a ReqRN command and the confirmation of the response from the wireless tag TA with respect to the ReqRN command according to the standard of ISO/IEC 18000-6 Type C in practice, but the detailed description and the drawings of the process are omitted.

In ACT 11 in FIG. 4, the processor 1771 reduces the value of the variable M by one.

In ACT 12, the processor 1771 confirms whether the rewriting with respect to all of the wireless tags TA attached to the print medium to be a target of the image forming is completed. For example, if the variable M is "1" or more, the processor 1771 determines that the rewriting is not completed, determines NO, and proceeds to ACT 13.

In ACT 13, the processor 1771 reduces the value of the variable N by one.

In ACT 14, the processor 1771 confirms whether a round is completed. Here, a period when the tag detection is repeated by a predetermined limit number is set as a round. For example, if the variable N is "1" or more, the processor 1771 determines that the round is not completed, determines NO, and proceeds to ACT 15.

In ACT 15, the processor 1771 transmits the QueryRep command. The transmission of the QueryRep command is an event EAF in FIG. 6. The QueryRep command is received by each of the wireless tags TAA to TAE. However, the wireless tag TA that already completes a response to the reception of the Query command or the QueryRep command after the reception of the Select command ignores the current QueryRep command. That is, the wireless tag TAB ignores the QueryRep command transmitted as the event EAF.

If the wireless tag TA that is not responded receives the QueryRep command, the value of the counter value CV is reduced by one. Also, if the counter value CV after the reduction is "0", the wireless tag TA transmits the response data for notifying the random number RN. The wireless tags TAA, and TAC to TAE set the counter values CV to "2", "2", "1", and "3" in response to the event EAF. Accordingly, since none of the counter values CV are "0", none of the wireless tags TAA, and TAC to TAE transmit response data.

If the QueryRep command is transmitted, the processor 1771 returns to ACT 7 in FIG. 4. Also, if response data is not obtained until predetermined waiting time elapses, for example, after the transmission of the QueryRep command, the processor 1771 determines that there is no response, determines NO in ACT 7, skips ACTS 8 to 12, proceeds to ACT 13, and repeats ACT 13 and subsequent steps as above. If there is no response from the wireless tag TA in this manner, the processor 1771 reduces the value of the variable N in ACT 13 by one. Also, if the round is not yet completed, and it is determined to be NO in ACT 14, the processor 1771 repeats ACT 15 and subsequent steps as above. Accordingly, the processor 1771 transmits the QueryRep command as an event EAG in FIG. 7. The wireless tags TAA, and TAC to TAE sets the counter values CV to "1", "1", "0", and "2" in response to the event EAG. Accordingly, since the counter value CV is set to "0", the wireless tag TAD transmits the response data including the data indicating "AD" that is the random number RN of its own, as an event EBC in FIG. 7.

Thereafter, in the same manner as above, through the transmission and reception of the ACK command as an event EAH, the transmission and reception of the notification data as an event EBD, and also the transmission and reception of the Write command as an event EAI, the wireless tag TAD rewrites the identification code to "3010 2EDA F110 F040 0000 0002".

Figure 8:
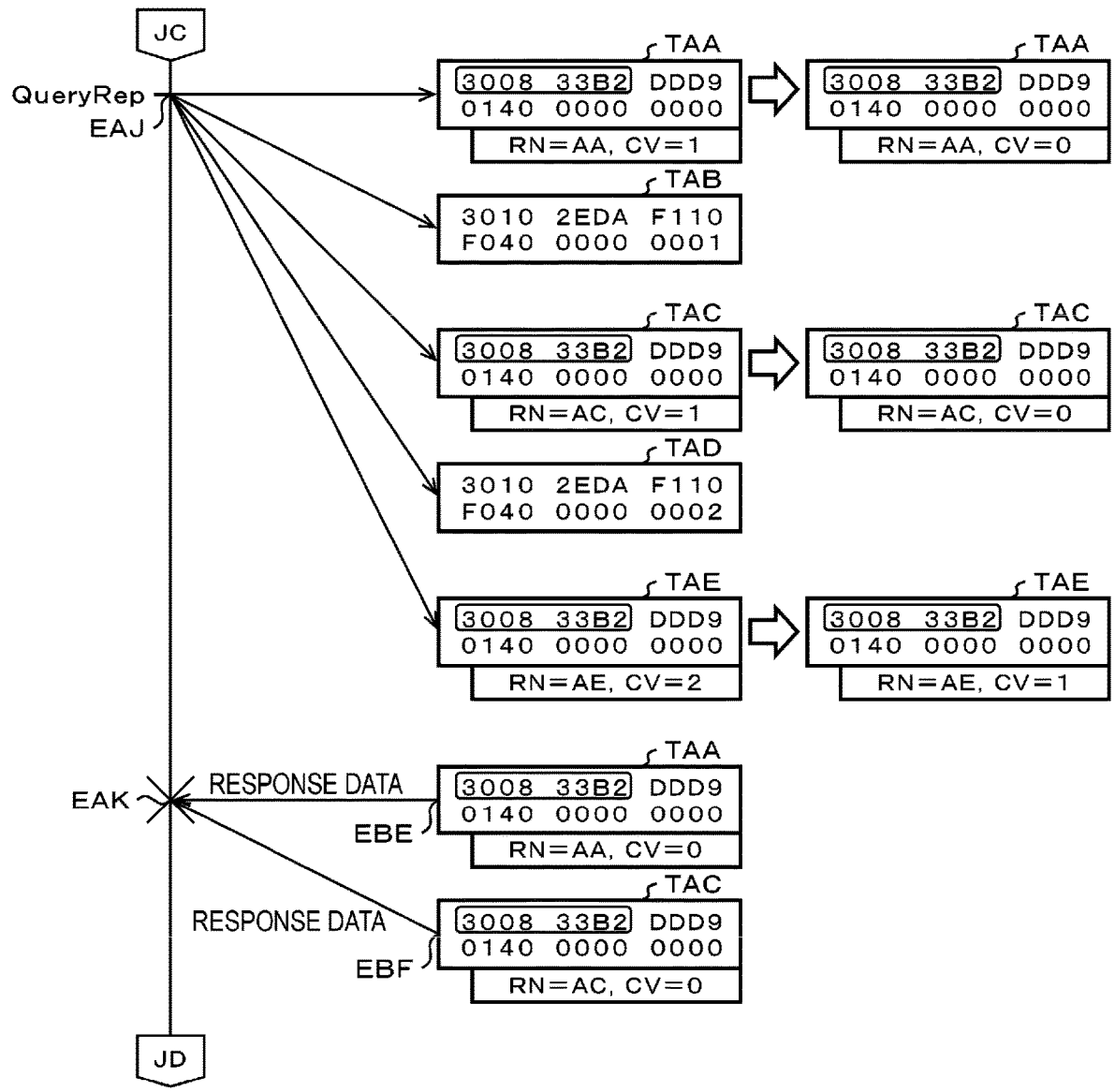
FIG. 8 is a diagram illustrating an example of a sequence of communication between the tag communication unit and the wireless tag and state changes of the wireless tag.

Subsequently, the processor 1771 transmits the QueryRep command as an event EAJ in FIG. 8. The wireless tags TAA, TAC, and TAE set the counter value CV to "0", "0", and "1" in response to the event EAJ. Accordingly, since the counter value CV is "0", the wireless tag TAA transmits the response data including data representing "AA" that is the random number RN of its own, as an event EBE. In addition, since the counter value CV is "0", the wireless tag TAC transmits the response data including data representing "AC" that is the random number RN of its own, as an event EBF. The event EBE and the event EBF occur almost at the same time. Therefore, in the processor 1771, a collision of response data occurs as an event EAK, and none of the response data can be obtained correctly. Accordingly, the processor 1771 considers that no response is made and determines NO in ACT 7.

Figure 9:
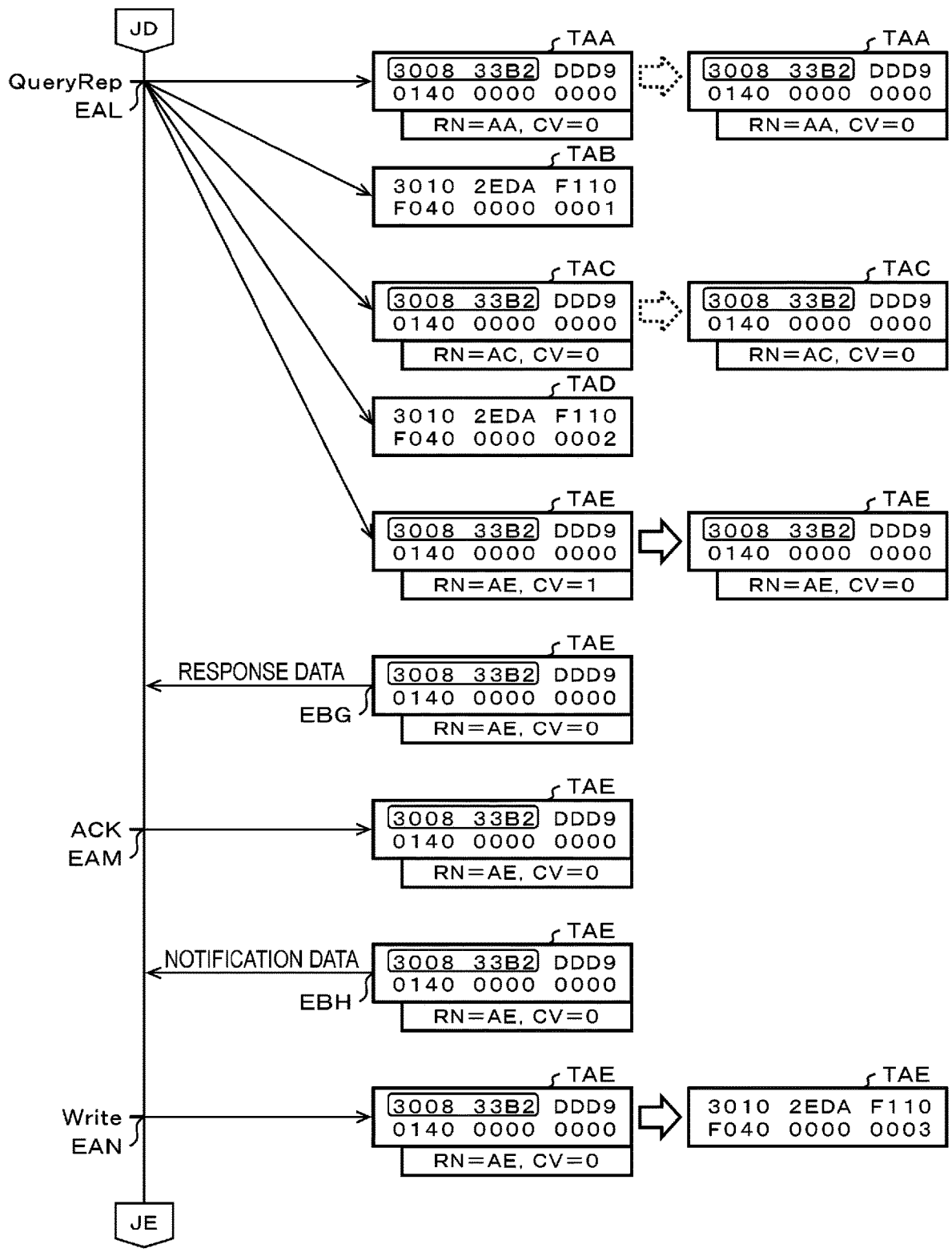
FIG. 9 is a diagram illustrating an example of a sequence of communication between the tag communication unit and the wireless tag and state changes of the wireless tag.

Subsequently, the processor 1771 transmits the QueryRep command as an event EAL in FIG. 9. The wireless tag TAE sets the counter value CV to be "0" in response to the event EAL. Accordingly, since the counter value CV is set to "0", the wireless tag TAE transmits response data including data representing "AE" that is the random number RN of its own, as an event EBG. In addition, the wireless tag TAA and the wireless tag TAC already transmit the response data, and thus do not transmit the response data, here.

Subsequently, as described above, through the transmission and reception of the ACK command as an event EAM, the transmission and reception of notification data as an event EBH, and further the transmission and reception of the Write command as an event EAN, the wireless tag TAE rewrites the identification code to "3010 2EDA F110 F040 0000 0003".

Thereafter, the transmission of the QueryRep command in ACT 15 in FIG. 4 is repeated, but both of the wireless tag TAA and the wireless tag TAC do not transmit the response data, the rewriting is not completed, and the processor 1771 determines NO in ACT 12. Also, if the number of repetition of the transmission of the Query command and the QueryRep command by the processor 1771 reaches a limit number, the processor 1771 changes the variable N to "0" in ACT 13. For example, if the variable N is set to "0" in this manner, the processor 1771 determines that the round is completed and determines YES in ACT 14, returns to ACT 4, and repeats ACT 4 and subsequent steps as described above. That is, the processor 1771 starts a new round.

Figure 10:
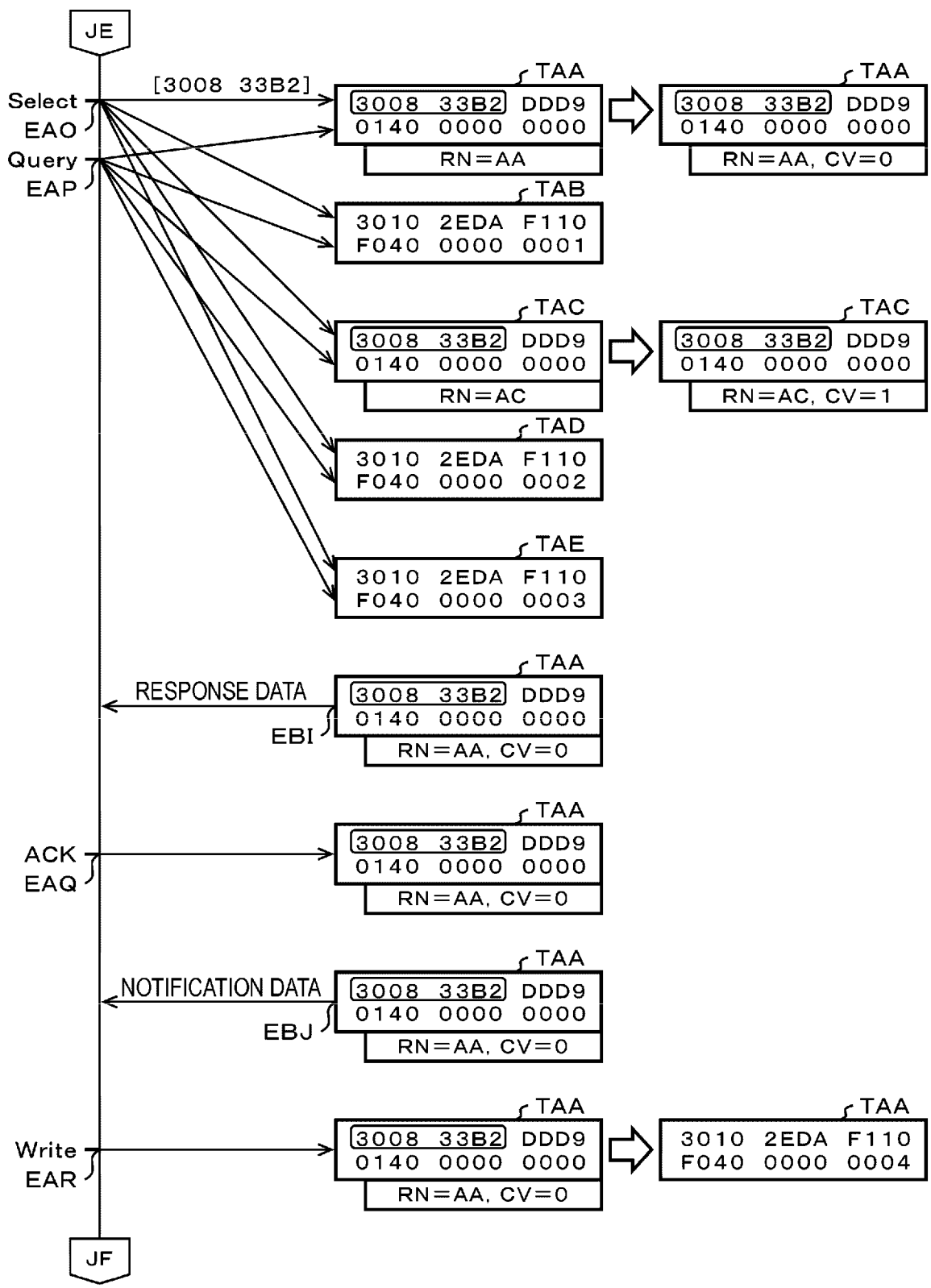
FIG. 10 is a diagram illustrating an example of a sequence of communication between the tag communication unit and the wireless tag and state changes of the wireless tag.

Also, the processor 1771 transmits the Select command as in the event EAB, as an event EAO in FIG. 10, and also transmits the Query command as an event EAP. The Select command and the Query command are received by each of the wireless tags TAA to TAE.

However, the wireless tags TAB, TAD, and TAE do not include the identical mask pattern to which identification codes are rewritten, and thus ignore the Query command. The wireless tags TAA and TAC include identification codes with the identical mask pattern, and thus generate "0" and "1" as the counter values CV in response to the event EAP, respectively.

The wireless tag TAA determines "0" as the counter value CV, and thus transmits response data including data representing "AA" that is the random number RN of its own as an event EBI.

Thereafter, as described above, through the transmission and reception of the ACK command as an event EAQ, the transmission and reception of the notification data as an event EBJ, and also the transmission and reception of the Write command as an event EAR, the wireless tag TAA rewrites the identification code to "3010 2EDA F110 F040 0000 0004".

Figure 11:
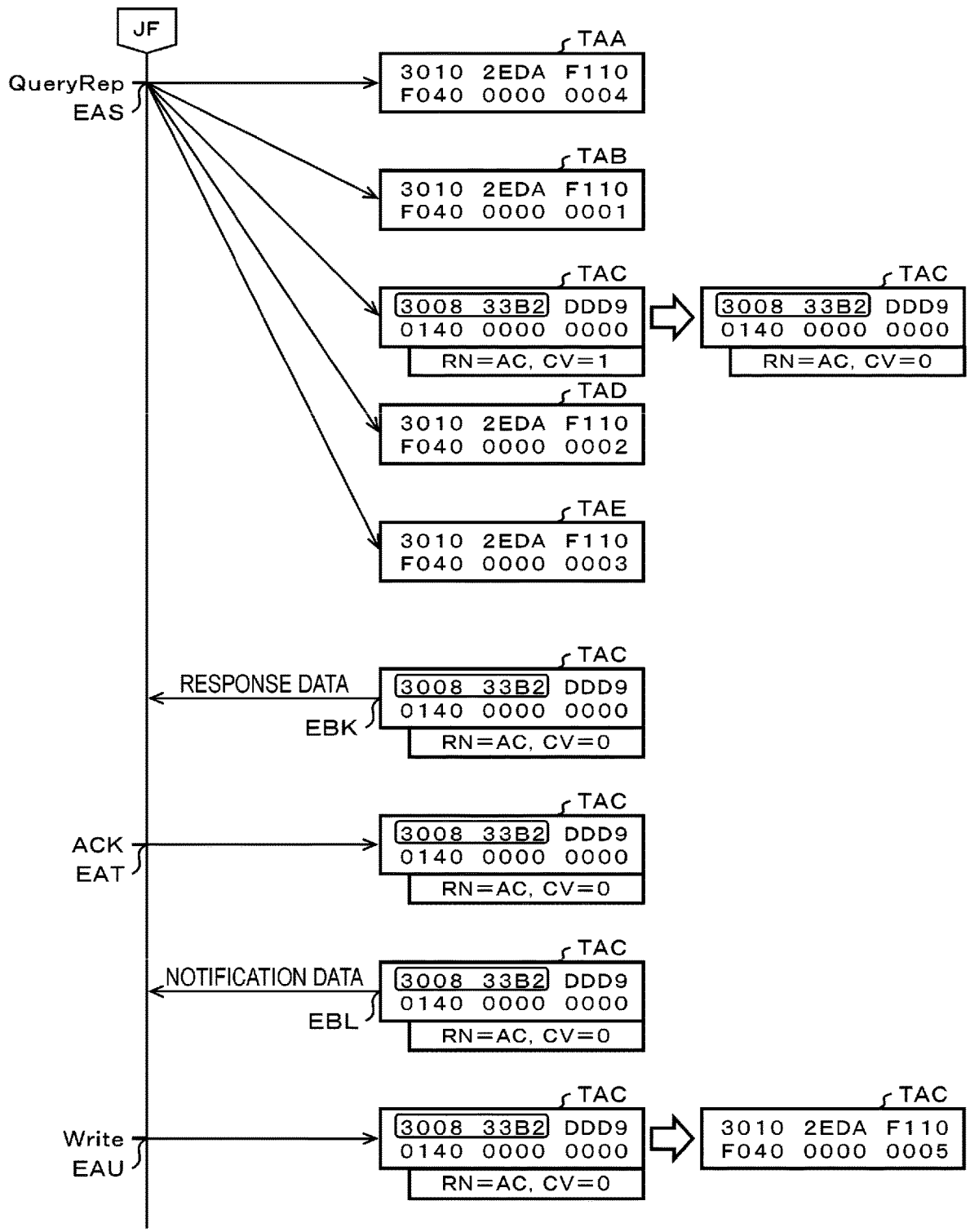
FIG. 11 is a diagram illustrating an example of a sequence of communication between the tag communication unit and the wireless tag and state changes of the wireless tag.

Subsequently, the processor 1771 transmits the QueryRep command as an event EAS in FIG. 11. The wireless tag TAC sets the counter value CV to "0" in response to the event EAS. Accordingly, since the counter value CV is set to "0", the wireless tag TAC transmits response data including data representing "AC" that is the random number RN of its own, as an event EBK.

Thereafter, as described above, through the transmission and reception of the ACK command as an event EAT, the transmission and reception of the notification data as an event EBL, and also the transmission and reception of the Write command as an event EAU, the wireless tag TAC rewrites the identification code to "3010 2EDA F110 F040 0000 0005".

As described herein, the processor 1771 repetitively transmits the Query command and the QueryRep command. Thus, the processor 1771 performs the information process based on the rewrite program PRA, and thus the processor 1771 functions as a control unit that repeats the transmission of the Query command and the QueryRep command as the second command.

In this manner, after the rewriting of the identification codes of all of the wireless tags TAA to TAE is completed, the processor 1771 changes the variable M to "0" in ACT 11. For example, if the variable M is set to "0", the processor 1771 determines that the rewriting is completed, determines YES in ACT 12, and proceeds to ACT 16.

In ACT 16, the processor 1771 stops the radio wave radiation. For example, the processor 1771 stops the output of the transmission signal to the modulation unit 171. Thereafter, the processor 1771 completes the rewrite process.

As described above, the tag communication unit 17 in the multifunction device 1 selectively and sequentially rewrites the identification codes of the wireless tags TAA to TAE by the communication. Accordingly, the tag communication unit 17 may be in a state of capable of simultaneously communicating with the wireless tags TAA to TAE and can be implemented in a simpler configuration than a case where a mechanical measures such as disposition of a radio wave shielding member is taken.

In addition, in the multifunction device 1, the setting data including the mask pattern designated by the operator is included in the setting file FIA, stored in the auxiliary storage unit 12, and applied to the rewrite process. Therefore, if there are a plurality of kinds of label paper with tags of which identification codes preset in the attached wireless tag TA are respectively different, by setting the mask pattern in response to which label paper with tags is to be used as print medium, a proper operation can be performed.

Various modifications of this embodiment can be made as follows.

In the above embodiment, the Select command in ISO/IEC 18000-6 Type C is used as the first command, the Query command and the QueryRep command are used as the second command, and the Write command is used as the third command. However, while ISO/IEC 18000-6 Type C is basically used, at least one of the Select command, the Query command, the QueryRep command, and the Write command may be replaced with a partially changed command or another command. In addition, by setting the commands to be in conformity with a standard other than ISO/IEC 18000-6 Type C, commands totally different from the Select command, the Query command, the QueryRep command, and the Write command may be used as the first to third commands.

As the mask pattern, for example, a code predetermined by a designer of the multifunction device 1 may be used in a fixed manner.

The wireless tag TA to which the identification code is to be rewritten is not necessarily required to be attached to the print medium, and may be in any state. Also, the tag communication device of the present application may be incorporated into any device other than the multifunction device 1 or may be implemented as an independent tag communication device mainly having a function of rewriting the identification code of the wireless tag TA.

A part or all of the functions implemented by the processor 1771 by information process can also be implemented by hardware such as a logic circuit that performs information process that is not based on a program. In addition, each of the functions can be implemented by combining software control with the above hardware such as a logic circuit.

While certain embodiments have been described, these embodiments have been presented by way of example only, and are not intended to limit the scope of the inventions. Indeed, the novel embodiment described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A tag communication device comprising:
a communication device configured to wirelessly communicate with a plurality of wireless tags each storing an identification code including an existing common portion as at least a part of the common portion;
one or more processors configured to:
designate at least a part of the common portion as a mask pattern and cause the communication device to transmit a first command for notifying to select the wireless tag including the identification code, the identification code further including the corresponding mask pattern;
cause the communication device to transmit a second command for requesting a response to the selected wireless tag;
cause the communication device to transmit a third command for requesting rewriting of the identification code to one of the wireless tags that transmits data in response to receiving the data transmitted from the one wireless tag with respect to the second command by the communication device; and
cause a repeat transmission of the second command, if a third command is being transmitted, until the third commands have been transmitted to each of a predetermined number of the wireless tags, or if the data transmitted from one of the wireless tags is not received by the communication device with respect to the transmission of the second command.

2. The device according to claim 1,
wherein the one or more processors are configured to, in response to the third commands being transmitted, request rewriting to different identification codes.

3. The device according to claim 1,
wherein the one or more processors are configured to store a code designated by an operator and set the stored code to be the mask pattern.

4. The device according to claim 1, wherein:

the tag communication device is provided to an image forming device that forms an image on a print medium including a plurality of labels to which the plurality of wireless tags are attached, respectively; and the one or more processors are configured to:
- cause the communication device to wirelessly communicate with the plurality of wireless tags attached to the print medium to which the image is formed by the image forming device, and
- cause a repeat of the transmission of the second command until the third commands are transmitted to the wireless tags by the number of wireless tags attached to the print medium.

5. An information processing method comprising:

wirelessly communicating, by a communication device, with a plurality of wireless tags that respectively store identification codes including an existing common portion as at least a part of the common portion;

designating at least a part of the common portion as a mask pattern and causing the communication device to transmit a first command for notifying selection of the wireless tag including the identification code, the identification code further including the corresponding mask pattern;

causing the communication device to transmit a second command for requesting a response to the selected wireless tag;

causing the communication device to transmit a third command for requesting rewriting of the identification code to one of the wireless tags that transmits data in response to receiving the data transmitted from the one wireless tag with respect to the second command by the communication device; and causing a repeat of transmission of the second command if a third command is transmitted until the third commands are transmitted to each of a predetermined number of the wireless tags, or if the data transmitted from one of the wireless tags is not received by the communication device with respect to the transmission of the second command.

6. The method according to claim 5, further comprising:

requesting rewriting to different identification codes in response to the third commands being transmitted.

7. The method according to claim 5, further comprising:

storing a code designated by an operator; and setting the stored code to be the mask pattern.

8. The method according to claim 5, further comprising:

forming, by an image forming device, an image on a print medium including a plurality of labels to which the plurality of wireless tags are attached, respectively;

wirelessly communicating, by the communication device, with the plurality of wireless tags attached to the print medium to which the image is formed by the image forming device; and repeating the transmission of the second command until the third commands are transmitted to the wireless tags by the number of wireless tags attached to the print medium.

* * * * *